Figure 1:
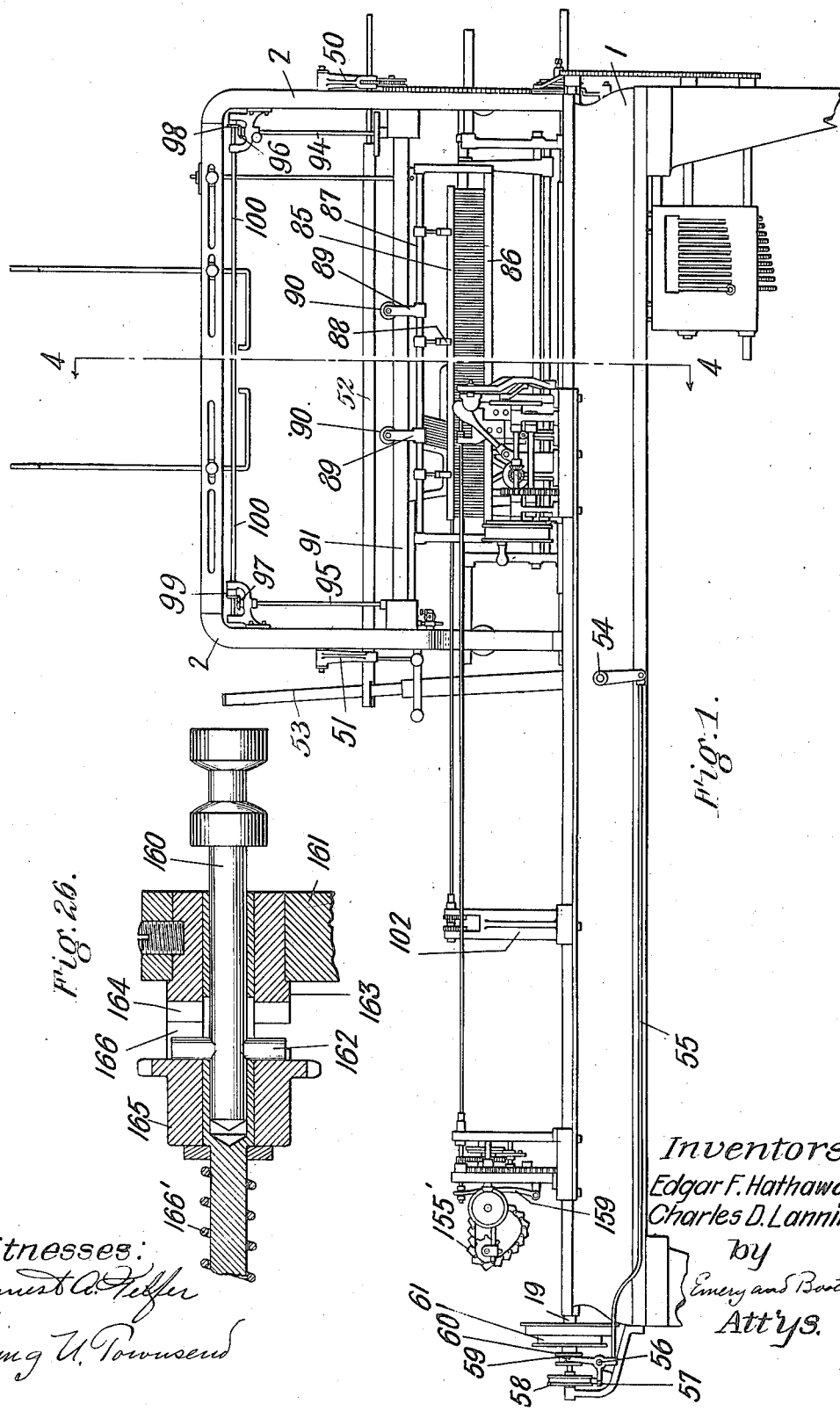

E. F. HATHAWAY & C. D. LANNING.
MECHANISM FOR OPERATING UPON METALLIC HEDDLES OR THE LIKE.
APPLICATION FILED MAY 9, 1907.

1,190,762.

Patented July 11, 1916.
9 SHEETS—SHEET 2.

Witnesses:
Ernest A. Telfer
Irving W. Townsend

Inventors
Edgar F. Hathaway
Charles D. Lanning
by Emery and Booth
Att'ys.

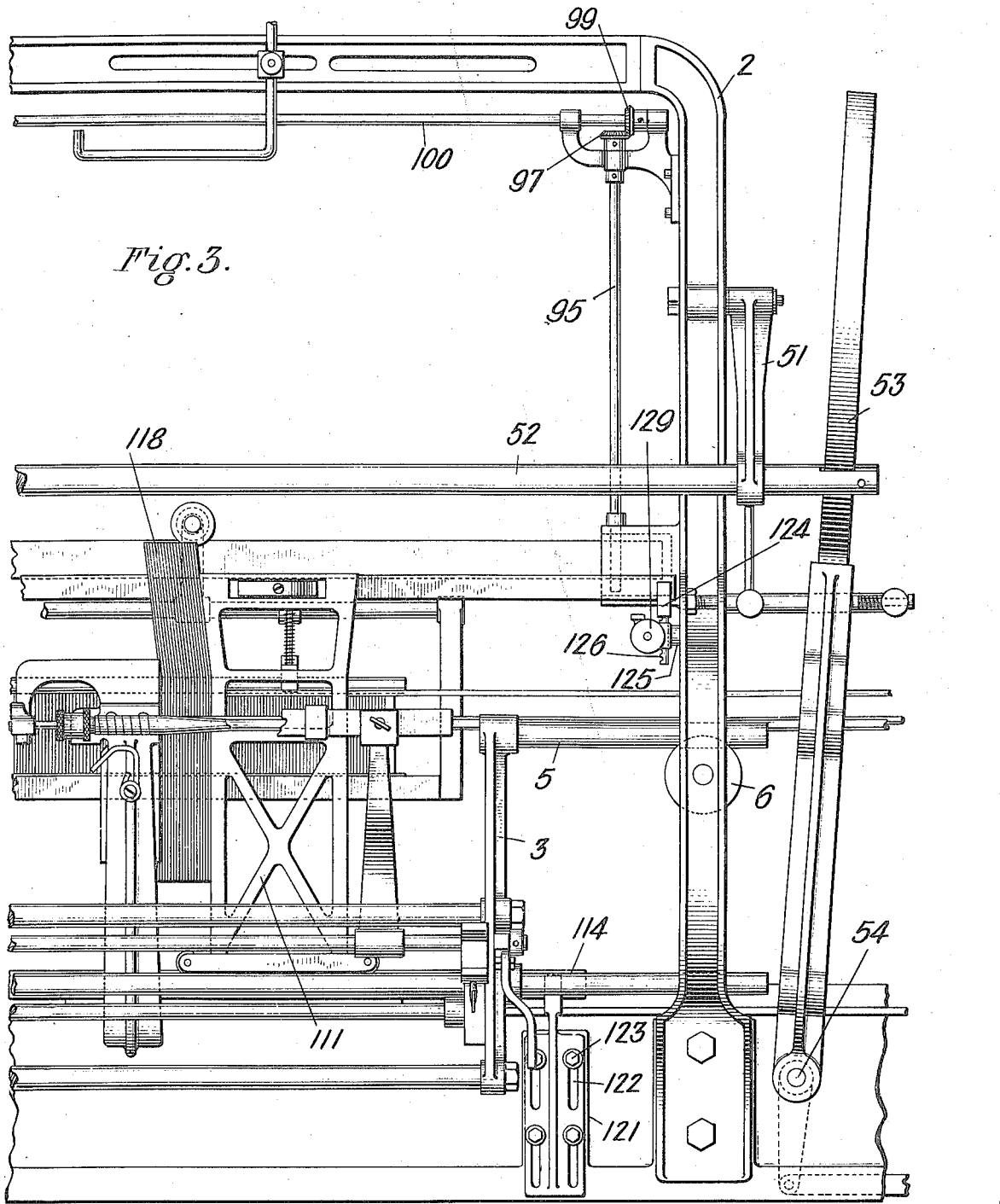

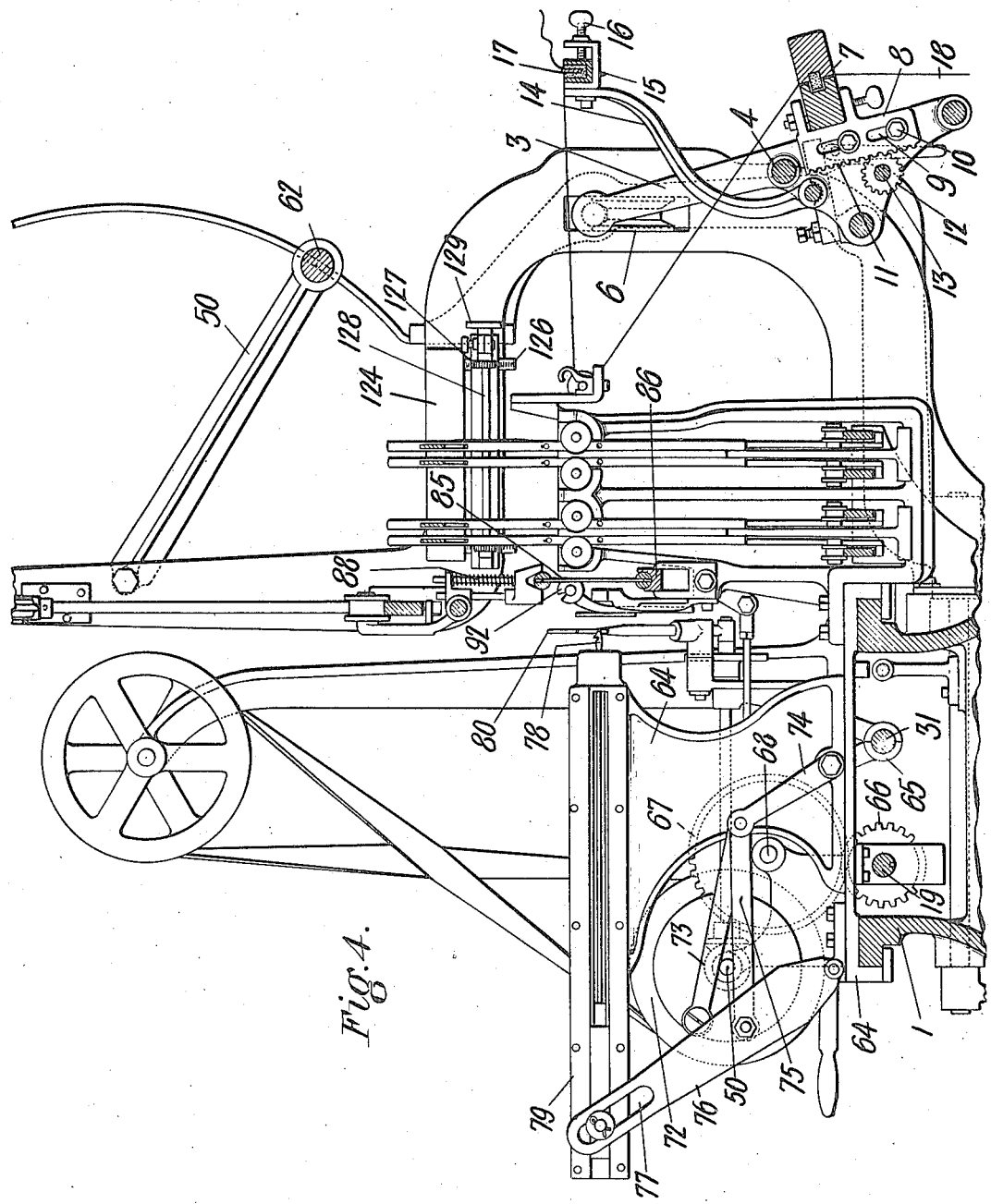

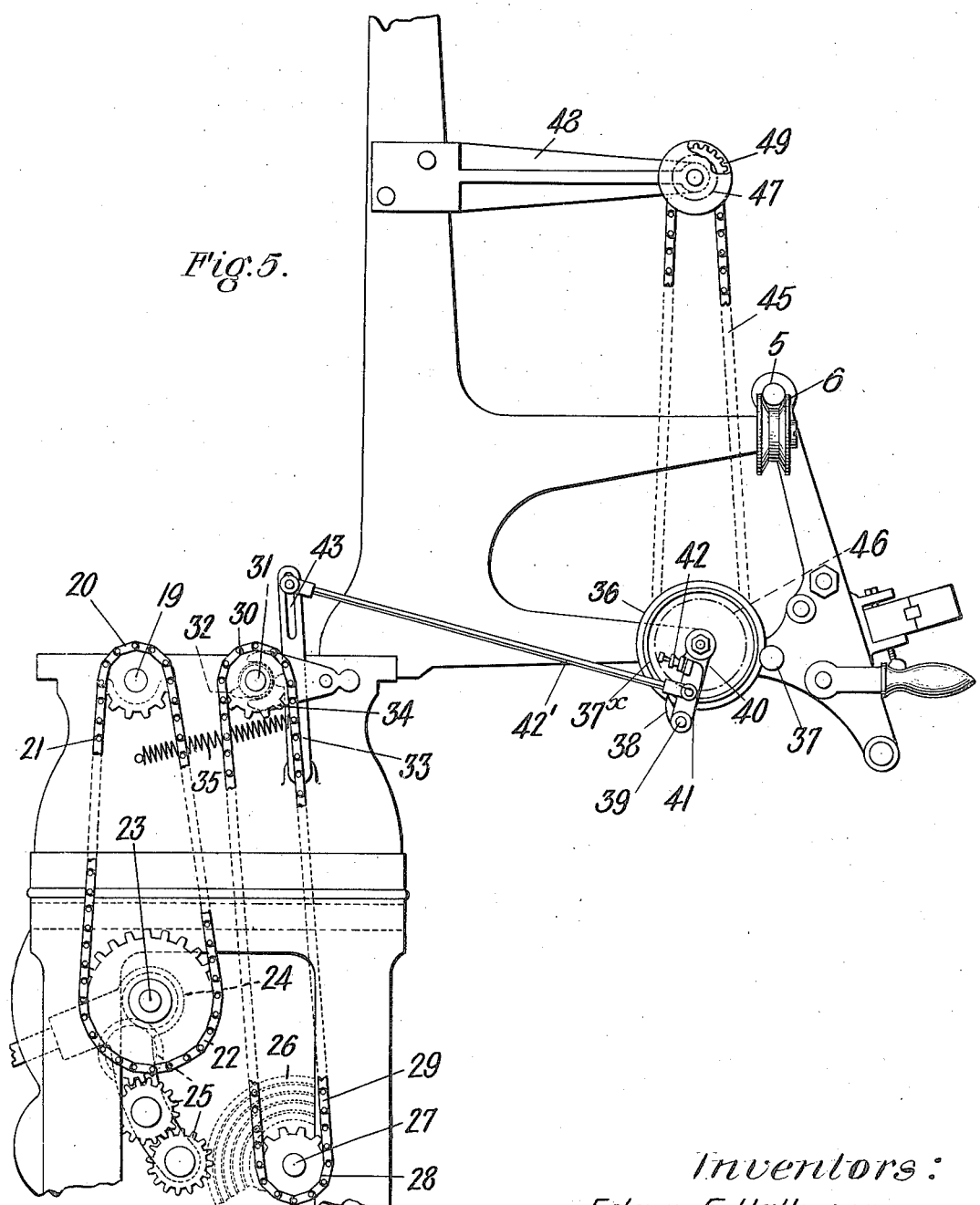

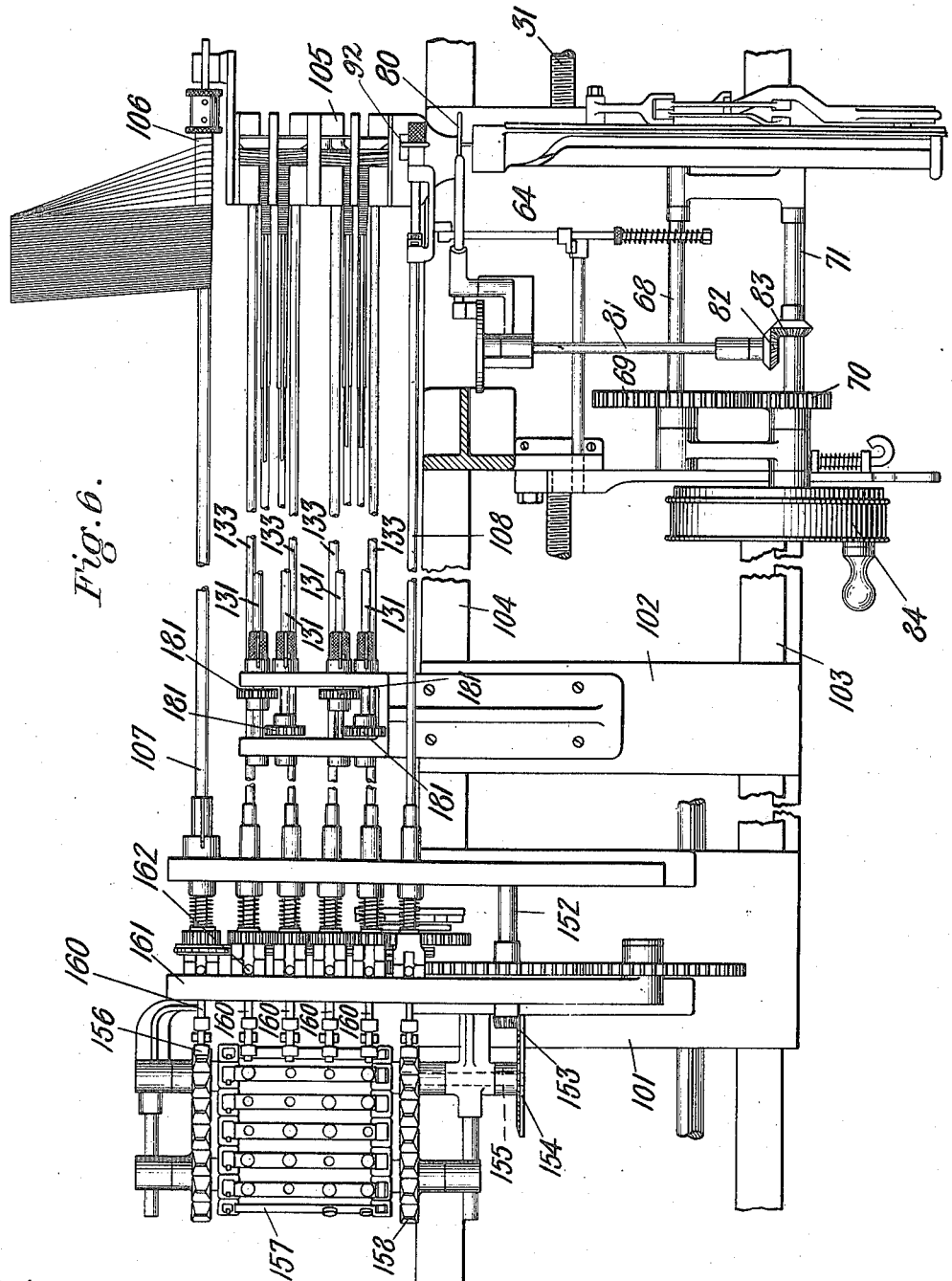

E. F. HATHAWAY & C. D. LANNING.
MECHANISM FOR OPERATING UPON METALLIC HEDDLES OR THE LIKE.
APPLICATION FILED MAY 9, 1907.
1,190,762.
Patented July 11, 1916.
9 SHEETS—SHEET 7.
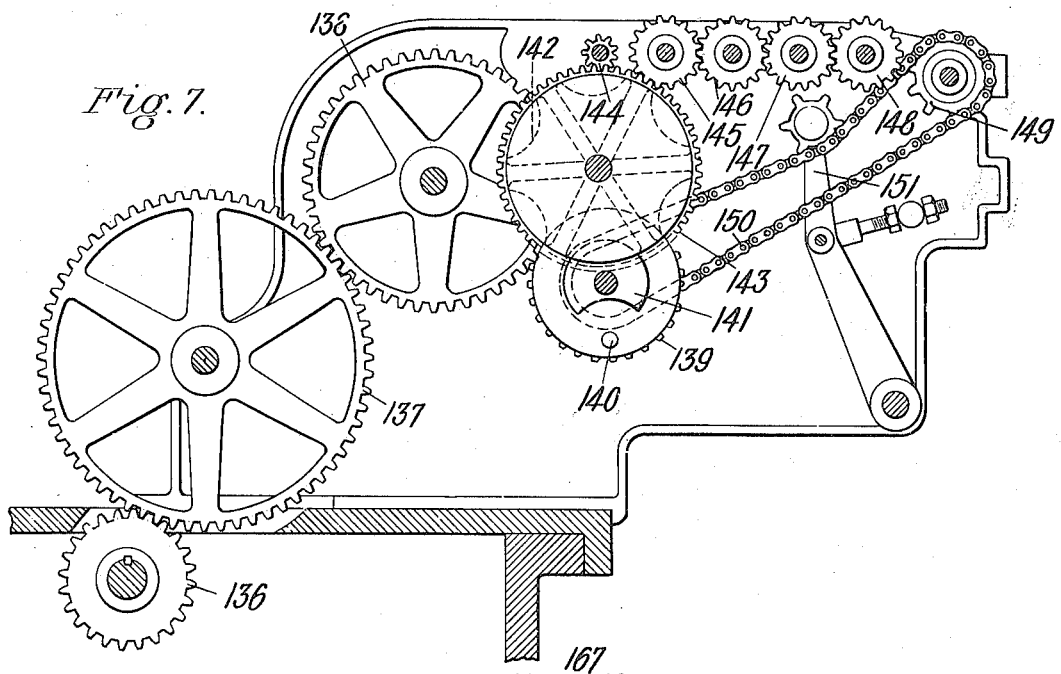
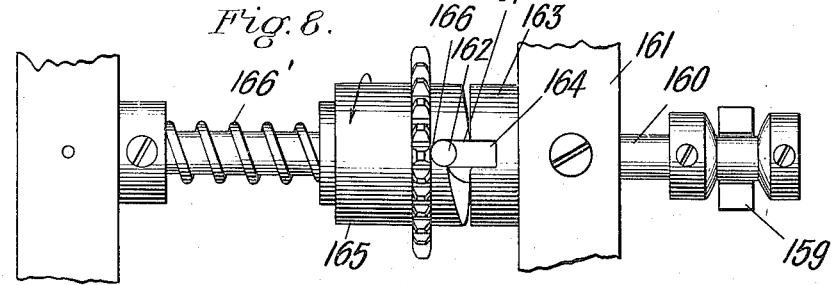
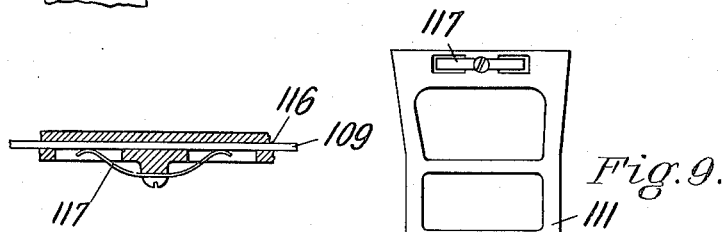
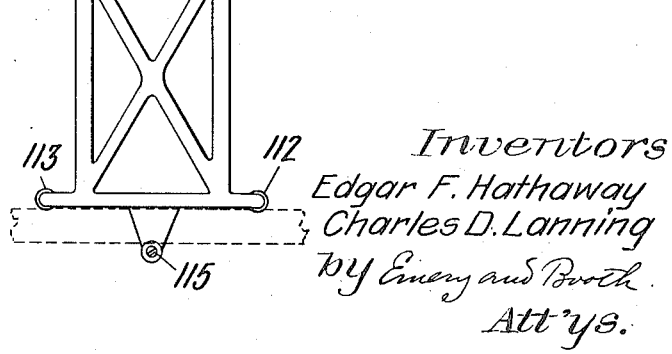
Witnesses:
Ernest A. Telfer
Irving U. Townsend
Inventors
Edgar F. Hathaway
Charles D. Lanning
by Emery and Booth
Att'ys.

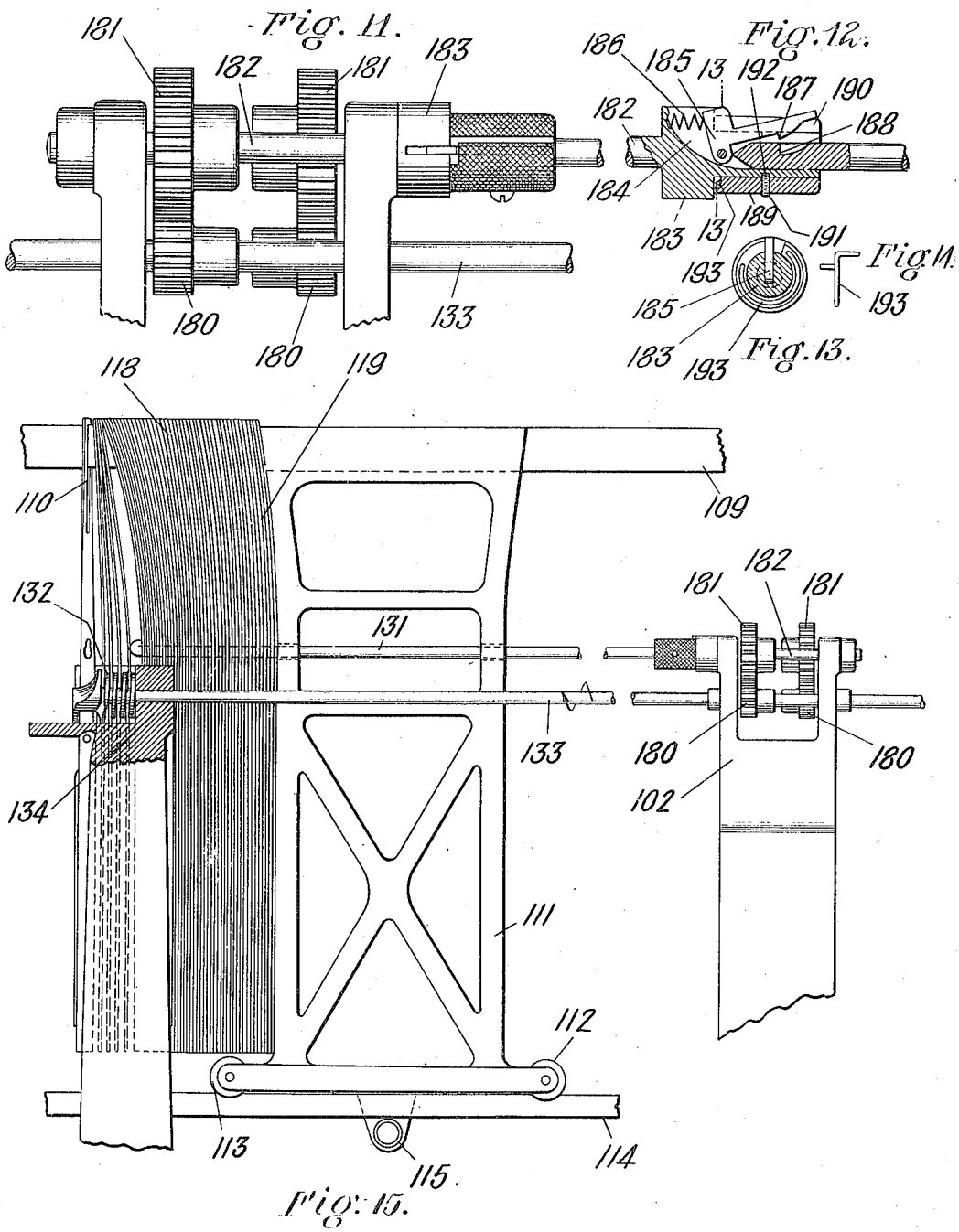

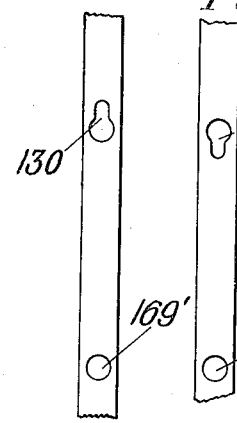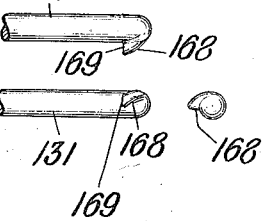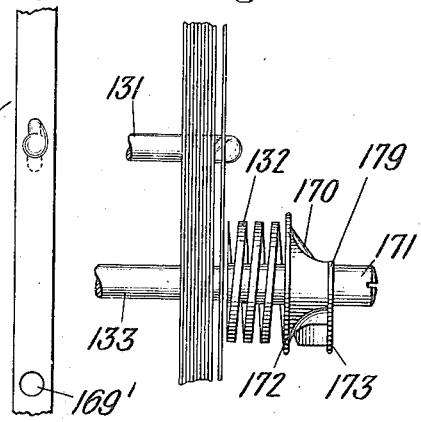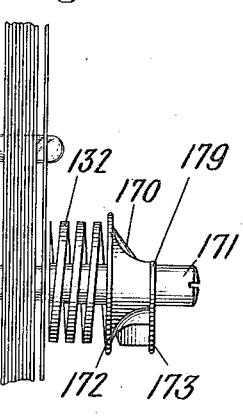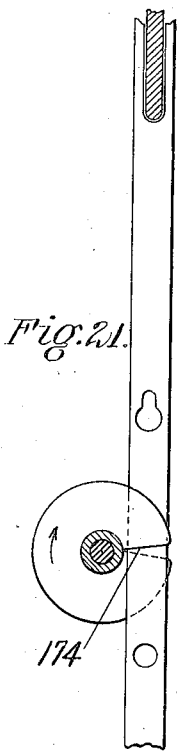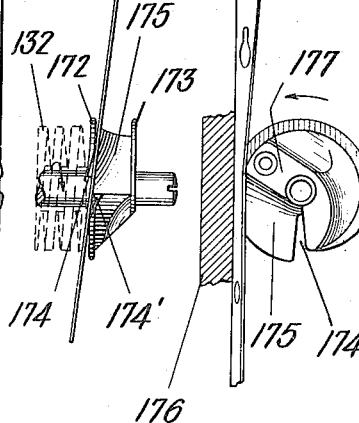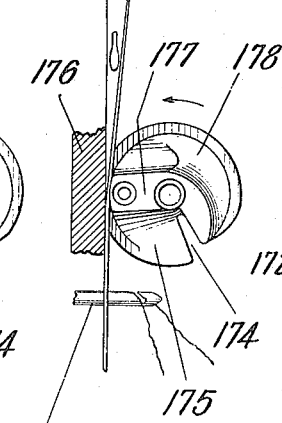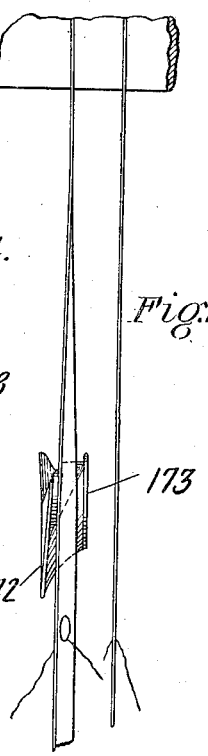

UNITED STATES PATENT OFFICE.

EDGAR F. HATHAWAY AND CHARLES D. LANNING, OF DORCHESTER, MASSACHUSETTS.

MECHANISM FOR OPERATING UPON METALLIC HEDDLES OR THE LIKE.

1,190,762. Specification of Letters Patent. Patented July 11, 1916.

Application filed May 9, 1907. Serial No. 372,729.

*To all whom it may concern:*

Be it known that we, EDGAR F. HATHAWAY and CHARLES D. LANNING, both citizens of the United States, and residing at Dorchester, in the county of Suffolk and State of Massachusetts, have invented an Improvement in Mechanism for Operating upon Metallic Heddles or the like, of which the following description, in connection with the accompanying drawings, is a specification, like letters on the drawings representing like parts.

This invention relates to mechanism for operating upon metallic heddles and in the specific embodiment thereof herein disclosed relates more particularly to the drawing of warp threads through metallic heddles.

In order that the principles of the invention may be clearly understood, we have disclosed a single type or embodiment thereof in the accompanying drawings, wherein—

Figure 2:
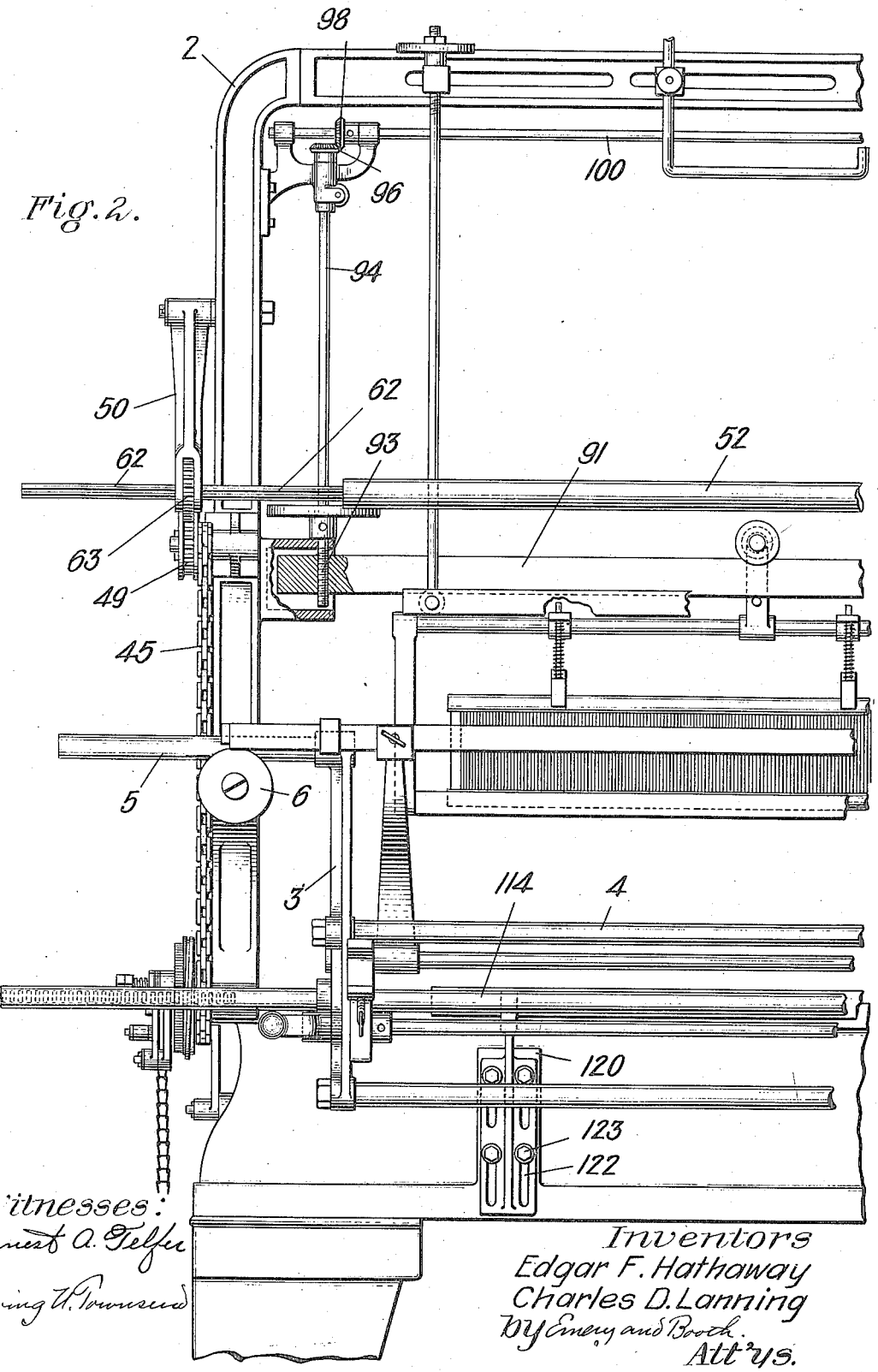

Figure 1 is a rear elevation of the main portion of the mechanism embodying one form of the invention, but representing, for the sake of clearness, only a small number of metallic heddles compacted for operation thereon, no heddles being represented as threaded and the mechanism being represented as centrally broken away; Fig. 2 is a front elevation of the left hand end of the machine represented in Fig. 1; Fig. 3 is a front elevation of the central portion of the mechanism represented in Fig. 1; Fig. 4 is a transverse, vertical section taken through the mechanism shown in Fig. 1 upon the line 4—4 of Fig. 1 looking toward the left in said figure; Fig. 5 is an end elevation of the left hand end of the mechanism looking toward the left viewing Fig. 1 and representing more particularly the automatic and manual means for effecting warp compensation; Fig. 6 is a plan view of the main operating portions of the mechanism centrally broken away and representing particularly the pattern control and drawing-in mechanism; Fig. 7 is a vertical transverse sectional view taken through the pattern head; Fig. 8 is a plan view of the clutch mechanism for controlling the warp worm and parts associated therewith; Fig. 9 is a side elevation of a form of heddle bar receiving carriage; Fig. 10 is a horizontal section taken through the upper portion of said carriage and representing a heddle bar positioned therein; Fig. 11 is a side elevation, viewed from the rear of the mechanism, of the intermediate carriage and parts associated therewith; Fig. 12 is a vertical section of the means for locking the heddle releasing key rod to its rotative support; Fig. 13 is a transverse, vertical section upon the line 13—13 of Fig. 12 and representing the spring connection for the parts of the locking means for the heddle releasing key rod; Fig. 14 is an edge elevation of a form of spring employed in the construction represented in Figs. 12 and 13; Fig. 15 is a side elevation, partially in section, representing the preferred manner of releasing, separating or conveying, and positioning metallic heddles of the type herein illustrated; Fig. 16 represents, in side elevation, a portion of a heddle having a perforation therein to be engaged by the heddle releasing key rod; Fig. 17 is a similar view of a heddle having a differently arranged perforation, which heddle is preferably used in alternation with that shown in Fig. 16 throughout the series of heddles; Fig. 18 represents in side elevation, in plan and in end elevation the form of heddle releasing key rod herein employed; Fig. 19 represents, in side elevation, a portion of a heddle and in end elevation the heddle releasing key rod in engagement therewith and in position to commence the release or separation of the leading heddle; Fig. 20 represents in side elevation a compacted series of heddles, the leading one of which is shown as being released therefrom, together with the heddles separating or conveying and positioning mechanism; Fig. 21 is a view partially in vertical section and partially in side elevation, representing a heddle as entering the turning or positioning mechanism; Fig. 22 represents, in side elevation of the positioning mechanism, a similar disposition of parts; Fig. 23 represents in transverse, vertical section, the heddle turning or positioning mechanism at a further stage of the turning operation, a portion of such mechanism being removed to disclose the interior construction; Fig. 24 represents the same parts in transverse, vertical section, but showing the heddle as fully turned or positioned and the drawing-in needle as in the threading eye of the heddle; Fig. 25 represents, in side elevation, a threaded and ejected heddle, the heddle positioning or turning mechanism, and a heddle that is being ejected therefrom after the threading operation; and Fig. 26 is a longitudinal vertical section of the mechanism shown in Fig. 8.

In that particular type of mechanism for operating upon warp threads herein represented, we have disclosed a mechanism for putting warp threads through harness eyes, this being specifically herein accomplished by a drawing-in needle. While in many aspects thereof our invention is in no wise limited thereto, yet herein we have specifically disclosed mechanism for controlling, conveying and positioning independent, detachable heddles; that is to say, heddles or holders such as are employed for controlling warp threads in weaving, and herein heddles that are entirely independent of each other so far as their structure is concerned, as distinguished from heddles composing ordinary woven or knit harness employed in the textile art. In such woven or knit harness, the heddles are formed as part of a continuous structure, one heddle being incapable of removal thereof without the severance of some organized formation. Independent or detached heddles, such as are herein specifically disclosed, are commonly made of metal and may be composed of wire twisted into the necessary form or of thin plates, such plates, which are here specifically disclosed, being perforated for the purpose of affording a heddle eye, and also preferably having such other perforations or formations as may be necessary for their support when used as a harness or similarly in the process of weaving. Preferably and as herein disclosed, such heddles are arranged in one or more series but detached from and independent of each other and regularly alternated in accordance with a chosen peculiarity of form, structure or position, as will be more fully disclosed.

In that specific embodiment of metallic heddles and parts associated therewith and mechanism for operating thereon herein disclosed, we have represented a warp support and a warp drawing-in mechanism, although in certain aspects of our invention any suitable form or type of mechanism for operating upon warp threads may be substituted therefor. The drawing-in needle and warp are mounted for traverse of one element past the other. Herein the drawing-in needle is represented as mounted for movement along the warp, it being understood, however, that the needle may be held stationary or substantially stationary and the warp traversed past it.

Referring more particularly to Figs. 1 to 5 inclusive, the body of the supporting or base portion for the mechanism is represented at 1, it being of any suitable character, material and form. Herein rising therefrom is an arch 2 for supporting certain of the operating parts. Preferably mounted in the front of the mechanism is a warp supporting carriage comprising vertically disposed end bars 3 (see Figs. 2, 3 and 4) and connected by a number of horizontal rods 4 in any suitable manner. Horizontally extending and herein from the upper end of the bars 3 are rods 5 guided for movement upon rolls 6 mounted in the arch of the machine. Owing to irregularities in the spacing of warp threads, it is desirable that means be provided to alter the relative position of the drawing-in needle and warp during and in addition to the traverse of the drawing-in needle past the warp, to compensate for such irregularities. While such compensation may be effected in various ways, herein we have disclosed the warp carriage as mounted for movement longitudinally of its support in the manner described. Herein we provide a lower warp clamp 7 of any suitable type removably mounted in the warp carriage and vertically adjustable in any suitable manner, as by the provision of brackets 8 at opposite ends of the carriage and having elongated slots 9 therein, through which pass bolts 10 securing such brackets in position. Preferably each bracket has formed therewith a rack 11 engaged by a pinion 12 mounted upon a common shaft 13 so that both brackets may be adjusted in unison. Rising from one of the cross rods of the warp carriage is a pair of arms 14 having a socket 15 at the upper portion thereof, wherein is removably supported, as by set screws 16, an upper thread clamp 17 of any suitable construction. The warp threads 18 pass upwardly from the warp beam (not shown) through the lower clamp 7, about the thread selecting mechanism, to be more fully described, and thence to the upper clamp wherein the ends are held. Herein the compensating movement of the drawing-in needle and the warp is effected by a movement of the warp, any suitable means being employed to effect such movement. For this type of the invention the following mechanism is selected. The main drive shaft of the mechanism is indicated at 19 (see more particularly Figs. 1 and 5), it extending longitudinally thereof and having its left hand end, viewing the mechanism from the front, provided with a sprocket wheel 20 (see Fig. 5) having thereon a sprocket chain 21 engaging a sprocket wheel 22 upon a countershaft 23 suitably supported beneath the bed of the machine, preferably as indicated in side elevation in Fig. 5. Also mounted upon said countershaft is a spur gear 24, meshing wherewith is a train 25 of change gearing in mesh with a gear 26 upon a second countershaft 27 likewise mounted beneath the bed of the machine and having thereon a sprocket gear 28 about which passes a sprocket chain 29, which extends upwardly and engages a sprocket wheel 30 upon a threaded shaft or lead screw 31 extending longitudinally of the machine and having thereon any suitable cam formation 32. Pivotally mounted upon the machine frame is an upwardly extending lever 33 preferably having thereon a projection 34 adapted to be engaged by the cam 32 in the rotation of the shaft 31, the lever 33 being held in operative relation to such cam by a spring 35.

Suitably mounted for rotative movement in the forward portion of the machine frame is a worm wheel 36 in meshing relation with a longitudinally disposed rack 37 mounted upon the warp carriage, whereby upon suitable movement of the worm wheel 36 the warp carriage may be moved in the required direction properly to aline or position the leading or foremost warp with the drawing-in needle. Herein the worm wheel 36 carries upon one face thereof a knurled or finely toothed disk 37ˣ, with which engages to rotate the same in a step by step manner a pawl 38 mounted upon a pin 39 loosely journaled in a swinging arm 40 mounted upon the shaft of the worm wheel, the opposite end of the pin 39 being secured to a stop lever 41, said swinging arm carrying an adjustable contact screw 42 permitting a fine degree of adjustment. Connected to the stop lever 41 is a rod 42′, the other end of which is pivotally connected to a slotted portion 43 of the lever 33. Thus, the independent swinging movement of the stop lever 41 is limited in one direction by the adjustable contact screw.

Preferably we provide means whereby a compensating movement may be imparted to the warp carriage, either automatically or manually, as desired. While different types of mechanism may be employed for the purpose, herein (Figs. 2 and 5) is indicated a sprocket chain 45 engaging a sprocket wheel 46 fast upon the shaft whereon the worm 36 is mounted, the said sprocket chain passing at its upper end about a sprocket wheel 47 mounted for rotation in a bracket 48 projecting from the frame of the machine. Coaxially mounted for rotation with the sprocket gear 47 is a pinion 49. As shown in Figs. 2 and 3, pivotally mounted at opposite ends of the arch of the machine for swinging movement in a vertical plane are lever arms 50 and 51, in the free ends whereof is mounted for axial and rotative movement a rod 52, one end whereof in any position thereof is operatively engaged with a lever arm 53 (see Figs. 1 and 3) pivoted at 54 in the frame of the machine and connected by a rod 55 to one arm of a three arm lever 56, an arm whereof is operatively connected to a brake band 57 engaging a brake wheel 58, the third arm 59 of the lever engaging a clutch member 60 adapted to be moved into driving engagement with a pulley 61 normally loose upon the main driving shaft 19. The pulley 61 may receive power from any suitable source. The opposite end of the rotative rod 52 has a splined axial opening therein, receiving therein for relative longitudinal movement a splined rod 62, mounted whereon and positioned by the pivoted arm 50 is a pinion 63 adapted when the rod 62 is lowered to mesh with the pinion 49, as clearly shown in Fig. 2. By the longitudinal movement of the rod 52, power may be applied to the machine, and in any longitudinal position of the said rod when depressed the pinion 63 is in meshing engagement with the pinion 49, whereby through the described sprocket gearing the worm 36 may be turned in the desired direction to aline the leading warp thread with the drawing-in needle. In order to afford convenient access to the operating parts of the mechanism, the rod 52 may be swung upwardly and held elevated by any suitable latch or similar mechanism. Any suitable mechanism may be substituted for that herein specifically described for accomplishing the compensating movement of the warp relative to the drawing-in needle, the particular mechanism disclosed being illustrative merely.

The drawing-in needle preferably employed in this type of our invention may be operated in any suitable manner. Herein (see Fig. 4) it is mounted upon a carriage 64 positioned for movement longitudinally of the bed 1 of the machine, and having a suitable nut 65 thereon engaging the screw shaft 31, whereby a suitable and preferably continuous movement is imparted to the needle carriage. Splined upon the main driving shaft 19 is a gear 66 meshing with and driving a gear 67 mounted upon a shaft 68 upon the needle carriage. Mounted upon the shaft 68 (see Fig. 6) is a gear 69 meshing with a pinion 70 on the shaft 71 horizontally mounted in the needle carriage and having thereon a crank disk 72. Connected to said crank disk is a link 73 pivotally connected to a lever arm 74 pivoted upon the base of the needle carriage and connected in turn to a link 75, that is at its other end pivotally connected to a lever arm 76 mounted upon said carriage at one end and at its other end having a slot 77 wherein is received an end of a drawing-in needle 78, which thereby is reciprocated at the proper intervals in guide ways 79. A blade 80 is provided to reciprocate transversely to the path of action of the drawing-in needle to withdraw the thread from the drawing-in needle after the same has been drawn through the reed and the proper heddle, such blade being operated in any suitable manner and herein being mounted for swinging movement upon a shaft 81 having a beveled gear 82 meshing with and rotated by a beveled gear 83 upon the shaft 71. As indicated in Fig. 6, a hand wheel 84 mounted upon the shaft 71 may be employed in order to operate by hand, if desired, the drawing-in needle.

In the operation of that type of drawing-in mechanism herein disclosed, the needle 78 is projected through a dent of a suitably supported reed and through that heddle that is operatively positioned for the purpose to seize the leading thread and draw the same through such heddle and the dent of the reed. The reed may be mounted in any suitable manner. Herein (see Figs. 1, 2, 3 and 4) the reed is indicated at 85, its lower edge being received by the lower longitudinally disposed member 86 of a reed carriage having an upper longitudinal member 87, depending from which are suitable yielding reed supporting members 88 normally held in spring pressed engagement with the upper edge of the reed but permitting the ready removal of the latter from the reed carriage. From the longitudinal member 87 of the reed carriage are upwardly extended arms 89 carrying rolls 90 mounted for longitudinal movement upon a bar or track 91 longitudinally disposed in the arch 2 of the machine, whereby the necessary alinement of the reed with respect to the other operating parts of the mechanism may be secured. Any suitable reed supporting mechanism may be employed to permit movement of the reed, which may receive its proper alining or compensating movement in any suitable manner, as by a reed opener 92 shown in Fig. 4. Thus, in any suitable manner the reed may be alined with respect to the leading warp thread.

Preferably the reed supporting carriage is mounted for vertical adjustment. While this may be accomplished in any desired way, herein the bar or track 91 (see Figs. 2 and 3) is provided at opposite ends with screw threaded openings 93 with which engage the screw threaded lower ends of upright shafts 94 and 95 having at the upper ends bevel gears 96 and 97 meshing with gears 98 and 99 upon a shaft 100 mounted in the arch of the machine. In any suitable manner, rotation may be imparted to the shaft 100, whereby a uniform vertical movement is imparted to opposite ends of the bar or track 91.

Viewing Fig. 1, the needle carriage during the drawing-in operation moves from right to left or toward that end of the machine whereat power is applied, such carriage thus traversing longitudinally past the reed, the series of heddles and the warp being moved as previously described by the threaded shaft 31, shown in plan in Fig. 6.

The shaft 31 also operatively engages to move synchronously with the needle carriage, a pattern head carriage 101 and an intermediate carriage 102, both of which carriages are suitably guided upon ways 103 and 104. As indicated in Fig. 6, the needle carriage 64 is provided with a forwardly projecting portion 105, wherein is supported for rotative movement a warp worm 106 about which the warp threads 18 are passed intermediate the clamps 7 and 17. Any suitable means may be provided in lieu of the warp worm suitably to select, separate and position the individual threads of the warp that they may be in turn engaged by the drawing-in needle. The shaft 107 of the warp worm is rotatably supported at its opposite end on the pattern head carriage 101.

Likewise mounted in the extension 105 of the needle carriage and in the pattern head carriage 101 is a reed opener rod 108 having mounted thereon the reed opener 92 which acts also to aline the reed with respect to the warp and the drawing-in needle.

As previously stated, the mechanism herein disclosed is more particularly intended to operate upon independent metallic heddles, which in the present type of the invention are shown as disposed in separate or independent banks, harnesses or series, the number of which harnesses or series depends upon the character of the work that is to be performed. For the simplest work two series of heddles may be employed, the individual members of which may be singly selected to be positioned for the drawing-in operation. Dependent upon the character of goods that is to be woven, the number of series may be extended or varied as desired. Herein for the purpose, we have indicated four series of heddles, but it is to be clearly understood that this number is illustrative merely of a single embodiment of the invention. As will be more fully described, heddles are singly or otherwise selected from the several series of heddles, in any desired sequence or order of such series, which order or sequence may be altered or varied during the drawing-in operation, as the character of the work may require.

While the heddles may be supported in any suitable manner to facilitate the threading or drawing-in operation, preferably we provide (see Fig. 15) heddle bars 109, each of which is inserted through the usual opening 110 in the upper end of individual or metallic heddles, the heddles preferably and in this type of the mechanism being unsupported at their lower ends. Individual heddles formed otherwise than as herein disclosed may be supported in any suitable manner dependent upon the peculiarities of formation thereof.

The heddle bars 109 are suitably and removably supported in any suitable manner upon projecting portions of the machine frame, as will be more fully described, each series of heddles being in practice strung upon its proper bar, which bars are then positioned in the machine frame.

Preferably each series of heddles is compacted, the heddles being singly and successively released or discharged from the series and positioned for the drawing-in operation. Any suitable means may be provided to compact the heddles and hold them in that condition. Herein for the purpose (see more particularly Figs. 3, 9, 10 and 15) we provide for each harness or series of heddles a heddle carriage 111 having at its lower end rolls 112 and 113 engaging the upper edge of a track 114 and a roll 115 engaging the lower face of such track. Each carriage is provided at its upper edge with a longitudinal way or socket 116 adapted to receive therein its proper heddle bar 109, as indicated more clearly in Fig. 10, frictional engagement being secured between the bar and its carriage in any suitable manner. Preferably the heddle carriage is provided with a plate spring 117, portions whereof engage the heddle bar in order to provide suitable resistance to the longitudinal movement of the carriage. Any suitable means may be provided if desired to regulate the degree of friction of the spring 117. Each series of heddles is positioned upon its bar 109 in advance of its carriage 111, as indicated at 118 in Figs. 3 and 15, wherein a small portion of a series of heddles is represented as compacted against the forward edge of the carriage. While the mass of heddles 118 may be compacted or massed in any suitable formation, preferably they are so assembled that a portion of each heddle is, while compacted, sprung or bowed from its normal position, and herein forwardly at its upper end, as clearly indicated in Figs. 3 and 15.
This may be accomplished by suitably inclining the upper leading edge of the carriage 111, as indicated at 119. If the heddles be so positioned, the natural tendency of each is to straighten out when released or discharged, whereby it tends to separate from the compacted series of heddles. As the drawing-in operation progresses the carriage 111 moves to the right, viewing Fig. 15, along the track 114 and the heddle bar 109, the spring 117 affording proper resistance to such movement of the carriage. After the drawing-in operation has been completed, each heddle bar 109 may be lifted from its carriage 111 which is prevented from partaking of such lifting movement by the roll 115 engaging the lower face of the track 114.

In view of the fact that heddles vary in length, we have provided means vertically to adjust the heddle carriage supporting tracks 114. As indicated in Figs. 2 and 3, the tracks are supported at opposite ends by brackets 120 and 121 having slots 122 therein to receive threaded bolts 123 whereby the vertical position of said brackets may be altered to adapt it to heddles of various lengths.

As indicated most clearly in Figs. 3 and 4, the heddle bars 109 are supported at opposite ends by cross bars 124 mounted for vertical adjusting movement in brackets 125 inwardly projecting from the arch of the machine. Any suitable means may be provided to effect such adjustment. Herein we have represented each cross bar 124 as provided with vertically disposed racks 126, meshing wherewith are pinions 127 upon a shaft 128 having thereon a hand wheel 129. Thus, whatever length of heddles be employed, the eyes therein may be positioned for the entrance of the drawing-in needle.

Any suitable means may be provided to hold the heddles in compacted position in their respective series as represented in Fig. 15 and to release or discharge the heddles singly and successively from such compacted series and to convey or separate the heddles and position them for the threading operation. While the heddles may be positioned or formed in any suitable manner to permit the release of single heddles in succession, preferably we so hold the heddles that each presents a holding formation to suitable releasing means, the holding formations for successive heddles being presented in varying positions. In the type of the invention here disclosed, the heddles are presented to the releasing mechanism in regular, alternate, linear variation, being provided with perforations 130 (represented in Figs. 16 and following), though in certain aspects of the invention any suitable heddle releasing formation may be provided. In the single type of the invention herein disclosed, each opening 130 is eccentric, being substantially key shaped; the openings in adjoining heddles are so disposed that the narrower portions of such openings alternately extend above and below the main body of the opening, as clearly indicated in Figs. 16 and 17.

Any suitable means may be provided to engage the openings 130 to permit the release of the heddles singly and successively from the compacted series. Herein we provide heddle releasing key rods 131 indicated most clearly in Figs. 15, 18, and 20, the leading end whereof is formed as will be more fully described to hold the heddles in compacted condition but releasing heddles individually and singly from the compacted mass and during the operation of the mechanism constantly moving such mass of heddles toward the opposite end of the machine from that whereat the drawing-in operation commences, in order to compensate for the spacing of the heddles that ensues upon and after the threading thereof.

Preferably we provide to coöperate with the heddles means positively to act upon and convey or separate the heddles to bring them into such position that the warp threads may be drawn through the eyes therein, it being understood that if desired the drawing-in operation may immediately succeed the release of the heddles from the compacted series. Any desired mechanism may be provided for the purpose, but, as indicated most clearly in Figs. 15, 20 and following, we have provided a worm or screw 132 fast but removably positioned upon a shaft 133 mounted for rotation in the portion 105 of the needle carriage, as indicated most clearly at 134 in Fig. 15. The heddle releasing key rods 131 and the worm shafts 133 are mounted for rotation in the intermediate carriage 102, the heddle releasing key rods 131 also receiving support in the respective carriages 111, as indicated in Fig. 15.

The heddle worm shafts 133 as well as the warp worm shaft 107 and the reed opener shaft 108 are mounted for rotative movement in the pattern head carriage 101, as indicated most clearly in Fig. 6, each of said shafts being preferably rotated in accordance with the requirements of any predetermined pattern. As will be more fully described, rotation of each heddle releasing key rod 131 is herein controlled by and is dependent upon the rotation of the corresponding heddle worm shaft 133. If, therefore, a rod 131 and its corresponding shaft 133 be withheld from rotation, it is apparent that the heddles will be held in compacted mass or series and that single heddles will not during such interruption of the rotative movement be released therefrom. Such interruption of the rotative movement in this type of the invention occurs when in conformity with the requirements of the predetermined pattern a heddle is being selected from another series of heddles for the threading operation and it may continue while any desired number of heddles are selected from one or more of the other harnesses or series of heddles. Similarly, if the reed opener 108 be withheld from rotative movement, the reed 85 remains stationary. The movement of the reed is dependent upon the requirements of the pattern and the number of threads to be drawn through the dents of the reed. Any suitable means may be provided to impart rotative movement to the said heddle worm shafts and reed opener shaft and any suitable mechanism may be employed to control such rotative movement. Herein and viewing more particularly Fig. 7, the main drive shaft 19 has splined thereon a spur gear 136 meshing with a spur gear 137 mounted upon the sliding pattern head carriage 101, and in turn meshing with a spur gear 138, which in turn rotates the spur gear 139 having a pin 140 upon one face thereof and a sprocket wheel 141 preferably upon the opposite face. The pin 140 engages in its rotative movement a star wheel 142, indicated in dotted lines in Fig. 7, and having co-axially mounted therewith a spur gear 143 meshing with a pinion 144 and a second and herein larger pinion 145, whereby movement is in turn imparted to pinions 146, 147 and 148. It will be apparent that through the pin 140 and star wheel 142 an intermittent movement of rotation is imparted to the gear 143 and consequently to the pinions 144, 145, 146, 147 and 148. In the present type of the invention, the pinion 144 is mounted upon the reed opener shaft 108, the pinions 145, 146, 147 and 148 being mounted upon the respective heddle worm shafts 133. Thus, each of said shafts is, even when brought into action by the pattern mechanism to be described, intermittently rotated. Preferably, however, the warp worm shaft 107 is constantly rotated during the periods when, by pattern or other mechanism, it is brought into action.

Intermittently rotating warp separating worms heretofore employed have in practice been found sufficient, but owing to the intermittent movement thereof, it has been necessary to rotate them at a relatively high rate of speed, which in many instances resulted in vibratory effects, to overcome which and to reduce the speed of the worm we have made the motion thereof continuous when the worm is under the control of the main driving mechanism. While this movement may be imparted in any suitable manner, herein the warp worm shaft 107 is provided with a sprocket wheel 149, about which and the sprocket wheel 141 passes a sprocket chain 150, herein shown as provided with any suitable type of chain tightener 151.

The spur gear 138 is mounted (see Fig. 6) upon a horizontally disposed shaft 152, having thereon a bevel pinion 153 engaging for rotative movement a bevel gear 154 mounted upon a shaft 155 suitably supported in the pattern head carriage transversely thereof. Upon said shaft and upon suitable sprocket gears 155' are mounted for movement the pattern chain 156 controlling the warp worm shaft, the pattern chain 157 controlling the heddle worm shafts and heddle releasing key rods and the pattern chain 158 controlling the reed opener. While any suitable type of mechanism may be employed coöperating with the pattern mechanism, we preferably, as indicated in Figs. 1, 6 and 8, provide levers 159 vertically disposed in the pattern head in the path of travel of the respective pattern chain to be engaged thereby and moved to the right, viewing Fig. 6 and to the left viewing Fig. 8. Each lever 159 engages a plunger shaft 160 mounted for sliding and rotary movement in the pattern head, as in a cross member 161 thereof and provided at its forward end with a transverse pin 162. Surrounding each shaft 160 is a stationary socket 163 having a slotted portion 164 to receive the pin 162 when the latter is withdrawn from active position. The warp worm shaft, the heddle worm shafts and the reed opener shaft are slotted at their rear ends and are there provided with clutch members 165 normally loose thereon and each having a slot 166 therein corresponding to the slotted portion of the respective shaft into which slots the respective pins 162 may be forced by the levers 159 according to the requirements of the pattern, thereby to clutch the member 165 to its shaft. The gears 144 to 149 are mounted upon the respective clutch members 165, and thereby, when clutched to their respective shafts, impart rotation thereto. When the pin 162 is positioned as indicated in Fig. 8, the rod corresponding thereto is rotated until the movement of the lever 159 to the right, viewing Fig. 8, withdraws the pin 162 into the slot 164. Each clutch or member 165 is preferably mounted for yielding longitudinal movement upon its shaft and is held in position by a spring 166', thus permitting the yielding of a clutch member if the pin 162 be not withdrawn at the proper time.

As previously described, the reed opener shaft and the heddle worm shafts are intermittently rotated. The pins 162 are moved into the slots 166 in the clutch members 165 during a period of rest of said clutch members. The clutch member 165 upon the warp worm 107 is, however, constantly rotated by the described mechanism, and hence we have, as indicated in Fig. 8, cut away or beveled a portion of the face of said clutch member 165 adjacent the slot 166 to permit the pin 162 to be gradually projected into such beveled or cut away portion, and when finally projected therein to be engaged by the shoulder 167 of the slot 166. Although a regular intermittent movement is imparted through the star wheel 142 to the clutch members 165 whereon are the gears 144 to 148, the shafts controlled thereby are not rotated until by the pattern mechanism the appropriate clutch member 165 is coupled to its shaft, and thereby the proper heddle operating mechanism or reed opener is brought into action. Similarly, although the clutch member 165 of the warp worm shaft 107 is continuously rotated by the sprocket gear 149, the warp worm 106 is at rest during the periods when its pin 162 is withdrawn from the clutch member 165. During the periods when the clutch member 165 of the warp worm 106 is clutched to the warp worm shaft, the warp worm receives a movement of constant rotation.

Any suitable means may be provided to release or discharge or permit the separation of the heddles singly and successively from each compacted series in accordance with the requirements of the pattern mechanism. Herein for the purpose we provide for each series of heddles what we herein term a heddle releasing key rod 131 adapted to be inserted through the openings 130 of the heddles, as indicated in Fig. 15. As previously stated, we may, if desired, and as shown in this type of the invention, so assemble the heddles in compacted position as that a portion of each heddle is deflected from the plane of the main portion of the heddle, whereby the normal tendency of each heddle is to straighten out and in doing so to separate from the mass or compacted series of heddles. As indicated in Fig. 15, this is accomplished in this specific embodiment of the invention by assembling the heddles so that the upper ends thereof project forwardly. Thus, when the leading heddle is released from the mass, its tendency is to spring forward or from the mass, as indicated in said figure. While, therefore, we may, if we desire, rely simply upon such tendency of the heddles to resume their normal condition, and merely release each heddle from the mass to permit it to assume such condition, preferably we also employ means positively to discharge the leading heddle from the mass at the proper moment. Although, in the present type of the invention, we have disclosed as conjointly used means for deflecting or bowing the body of each heddle or springing it so that its normal tendency is to resume a straightened condition and also means positively to discharge the leading heddle, it is to be understood that either means may be employed without the other.

As previously stated, the heddles of each series are arranged so that the narrow portions of the openings 130 therein project alternately in opposite directions. The protruding end of each heddle releasing key rod is formed in any suitable manner positively to engage the outer face of the foremost heddle, thereby to hold them compacted. While the heddle releasing key rod 131 may be so formed as merely to permit the release of each heddle singly and successively from the mass, herein we provide means positively to discharge the leading heddle. In the present type of the invention this is accomplished by providing the head of the key rod 131 with a lateral helical formation or wing 168 (see Fig. 18) of any suitable extent and angle of deflection from the axial line of the heddle releasing key rod. Preferably such helical formation is abruptly terminated as at 169, thus providing a shoulder adapted to engage the outer face of the leading heddle, as clearly indicated in Fig. 15. Viewing Figs. 19 and 20, if a movement of partial rotation be imparted to a heddle releasing key rod 131, in the direction of forward inclination of the helical formation thereon, the shoulder 169 is brought in alinement with the narrow portion of an opening 130 in the leading heddle, and upon a slight further movement of rotation the forward edge of the leading side of the helical formation at its line of junction with the shoulder 169, enters between the leading heddle and the succeeding heddle, and upon a further movement of rotation in the same direction positively forces or discharges the leading heddle from the mass, as clearly indicated in Fig. 20. Viewing Fig. 19, a movement of partial rotation of the heddle releasing key rod to the left or in the direction of the arrow tends to effect such discharge. It will be apparent that immediately upon the engagement of the shoulder 169 with the heddle succeeding the leading heddle, such succeeding heddle is held positively in engagement with the mass of heddles and its discharge or release with the leading heddle is prevented. Therefore, in the relation of parts indicated in Fig. 20, not only is the leading heddle being positively ejected from the mass but the succeeding heddle is positively held from release or ejection. In the type of the invention herein disclosed a movement of rotation of 180° imparted to the heddle releasing key rod 131 from its position wherein the shoulder 169 was alined with the narrow portion of the slot 130 in the leading heddle, brings the helical formation into such position that the release or ejection of the succeeding or second heddle is effected or commenced. A continued movement of rotation will singly and successively effect the discharge of the entire series of heddles. Since the packer carriage is positioned in proximity to the releasing rod 131, it acts in direct linear opposition to the releasing key, and any unevenness in an individual heddle or diversion from a true, flat form, tends to cause compression of that heddle at the point where the releasing key engages the same, so that apart from the bowing of the heddles due to the curvature of the packing carriage, the heddle has a tendency to spring away from the key when released. Preferably we employ means to convey or separate the heddles as discharged by the heddle releasing key rod. In this type of the invention the releasing key rod pushes or positively forces the released heddle into the conveying or separating means or into a position to be acted upon by such means. While any suitable means may be employed to convey or separate the heddles and while one or any desired number of heddles may be conveyed or separated at a time, herein, as indicated in Figs. 15 and 20, we provide a rotating worm 132, the rear end whereof receives the leading heddle as the same is positively discharged from the mass and conveys the same to a position for the passage of the drawing-in needle through the opening 169' in the heddle (see Figs. 16, 17 and 19). The worm 132 may be of any suitable length to accommodate simultaneously if desired a number of heddles. In Fig. 15, four heddles are indicated as engaged by the worm to be successively conveyed or delivered into position for the passage of the warp drawing-in needle through the opening 169' therein.

In the present type of the invention, the heddles normally occupy a position with the edges thereof in alinement or parallelism with the path of movement with the drawing-in needle, and hence, at a suitable period in the operation, we deflect or position each heddle to present its opening 169' to the drawing-in needle. This we may accomplish in any suitable manner. Herein we employ means rotatably connected with and succeeding in action the separating or conveying worm 132. Upon each worm shaft 133 is removably secured the worm 132, and in advance thereof is secured for rotation therewith the heddle positioning or turning device 170 (see Figs. 20 to 25), the conveying worm and such turning device being preferably separately formed and removably secured upon the worm shaft 133 by a nut 171. As indicated in said figures, the heddle turning or positioning device 170 is provided with opposite lateral faces 172 and 173, the latter of which is preferably removable. The face 172, adjacent the leading end of the worm 132 is provided with a preferably radial slot or opening 174 (see Figs. 21, 22, 23 and 24) to receive edgewise therein the leading heddle, as indicated in Fig. 22, a portion of the leading edge of such slot being preferably inwardly beveled as indicated at 174'. Rotatably succeeding the radial slot or opening 174, the body of the heddle turning device 170 is recessed as indicated at 175 in Figs. 22, 23 and 24, the recess being preferably beveled or rearwardly deepened toward the opposite face 173, as clearly indicated in said figures, so that as the heddle turning or positioning device is rotated, the heddle is turned from the position indicated in Fig. 21 to the position indicated in Fig. 23. Preferably a suitable abutment 176 is provided upon the adjacent portion of the needle carriage, against which the turned heddle is positioned as indicated in Figs. 23 and 24. Herein the recess 175 is succeeded or terminated by a substantially radial web 177, which coöperates with the abutment 176 to maintain the heddle in its turned position for the entrance of the warp drawing-in needle 78 as indicated in Fig. 24. The web 177 is of such extent as positively to hold the turned heddle in position for threading for the proper length of time. Rotatably succeeding the holding web 177 is a portion 178 inclined inwardly toward the face 173, the said face 173 being cut away as indicated at 179 in Fig. 20 to terminate at the base of such portion 178. The formation is such that after the movement of the holding web 177 from coöperation with the abutment 176 the portion 178 receives the heddle and by its inclined formation positively effects the discharge or ejection thereof, at the same time tending to restore the heddle to its normal position with its edge in a plane parallel to the path of movement of the drawing-in needle 78. Any suitable means may be employed to position or turn each heddle and preferably thereafter to effect the positive discharge or ejection of the heddle from threading position. It will be observed that the heddle when released from the series is under positive engagement by the conveying worm and is delivered by the latter for immediate, positive engagement by the turning worm, so that from the time it is released until it is faced, it is under the positive control of these devices.

In the present embodiment of the invention, a rotative movement is imparted to each heddle releasing key rod 131 and worm shaft 133, such rotative movement occuring at the periods determined by the pattern mechanism. It will be apparent from the foregoing description that a complete movement of rotation of the heddle positioning or turning device 170 completes the cycle of operations upon a single heddle to effect such positioning or turning movement and the final discharge or ejection thereof. It will further be apparent that a single complete rotation of a heddle releasing key rod 131 effects the discharge of two heddles. Preferably we operatively connect the heddle releasing key rod 131 and the worm shaft 133 of a pair of heddles so as properly to time their movements. This may be accomplished in any desired manner. Herein for the purpose we provide an intermediate carriage 102, shown in Figs. 1, 6, 11 and 15, wherein intermediate their ends are supported for rotation the several worm shafts 133. Each worm shaft has thereon a pinion 180 meshing with a pinion 181 upon a shaft 182, such pinion herein having twice the number of teeth as the pinion 180, so that the heddle releasing key rod is driven at one half the speed of the worm shaft 133. While each heddle releasing key rod may be formed as a continuation of its shaft 182, preferably we provide means removably to secure each heddle releasing key rod to such shaft so that it may rotate therewith. Herein for the purpose, we have indicated in Figs. 11 to 14 a head 183 formed upon the shaft 182 and having a longitudinally disposed radial slot 184 therein, wherein is pivoted a latch 185 normally maintained in locking position by a spring 186. The forward end of the latch is provided with a head 187 adapted to coöperate with a radial recess 188 formed in the end of the heddle releasing key rod 131, which for that purpose is received within an axially disposed socket in the head 183. Surrounding the head 183 is a thimble 189 having a longitudinal radial slot 190 and having a screw or projection 191 engaging an annular groove 192 in the thimble to permit rotative movement of the thimble but preventing longitudinal displacement thereof. Between the end of the thimble 189 and an adjacent annular shoulder upon the head 183 is a coiled spring 193, one end whereof is secured to the head and the other to the thimble, the tendency of the spring being to rotate the thimble to a position to maintain the latch 185 in locking engagement with the heddle releasing key rod 131. To lock a heddle releasing key rod in position, the thimble is turned against the stress of its spring 193 to bring the slot 190 therein in alinement with the latch 185, which is then elevated to permit the insertion of the key rod. The latch 185 thereupon operatively engages the key rod and the thimble 189 is by its spring 193 turned to prevent accidental disengagement of the latch and the key rod.

As previously described, the needle carriage 64, the pattern head carriage 101 and the intermediate carriage 102 are connected for synchronous movement and are moved toward the left viewing Fig. 1 by the longitudinally disposed screw 31. Viewing Fig. 15, it will be apparent that the movement of the heddle releasing key rod 131 to the right, viewing said figure, constantly traverses the diminishing mass of compacted heddles in each series toward the right, while effecting the discharge thereof singly, as has been described. Thus, not only are the heddles in this embodiment of the invention positively discharged singly and successively from the compacted mass, but such mass is positively traversed or moved from that end of the machine whereat the drawing-in operation commences. Such rearward movement of the heddle releasing key rods compels, by means of the pressure thereagainst of the heddles, a corresponding movement of each heddle carriage 111 along the track 114 at the base thereof and the heddle bar 107 at the upper ends thereof. When all the heddles of a series have been threaded, the heddle bar 109 may be engaged by the operative and lifted from its support upon the machine and from engagement with the heddle carriage 111, which is retained in position by the engagement of its roller 115 with the under face of the track 114. The reed 85 may readily be removed and the several heddles and reed may be bound to the warp beam for subsequent use in the loom.

There being no substantial structural difference between metallic heddles used as such and the closely similar devices known as drop bars or drop wires, it is evident that the invention as to many of its features and mechanisms is equally applicable to drop wires or drop bars and the term "heddle" is herein employed generically to denote drop wires or drop bars as well.

We do not herein claim the novel construction of the heddle *per se* herein shown, this being claimed in patent 1,120,195, the application for which was filed as a division of the present application.

Having thus described one type or embodiment of our invention, we desire it to be understood that although specific terms are employed, they are used in a generic and descriptive sense and not for purposes of limitation, the scope of the invention being set forth in the following claims.

Claims:

1. Mechanism for operating upon metallic heddles or the like comprising heddle holding means, means to compact said metallic heddles in a series with a portion of each heddle deflected from the normal plane thereof.

2. Mechanism for operating upon metallic heddles or the like comprising means to suspend heddles in a series and means to bend the entire series.

3. Mechanism for operating upon metallic heddles or the like comprising means to support the heddles in a series, and means simultaneously to bow the entire series of heddles while so supported.

4. Mechanism for operating upon metallic heddles or the like comprising means to suspend a series of heddles, means to bow said heddles from the normal plane of suspension, means to separate the leading heddle from the series, and means to move the series of heddles oppositely to the direction of release of the leading heddle.

5. Mechanism for operating upon independent heddles or the like comprising means to support such heddles in a plurality of series, pattern mechanism, and means controlled by said pattern mechanism to operate upon individual heddles of said series and move the same upon the support.

6. Mechanism for operating upon independent heddles or the like comprising heddle threading mechanism, means to support such heddles in a series, pattern mechanism, and mechanism under the control thereof to move the heddles upon the support and position them successively for the threading operation.

7. Mechanism for operating upon independent heddles or the like comprising means to support heddles in a plurality of series, pattern mechanism, and means controlled thereby to release the leading heddle of a series and move the same on the support while maintaining the heddles of the remaining series from release.

8. Mechanism for operating upon independent heddles or the like comprising heddle threading mechanism, means to support independent heddles in a plurality of series, and means to withhold the next heddle to be threaded in a given series during a plurality of heddle threading operations upon the heddles of one or more other series.

9. Mechanism for operating upon warp threads or the like comprising heddle threading mechanism, means to position in a plurality of series independently and bodily movable heddles, pattern mechanism, and means under the control thereof, whereby the leading heddle of any series is bodily released from the series.

10. Mechanism for operating upon independent, bodily movable heddles comprising means to support such independent heddles in a plurality of series, pattern mechanism, and means to release heddles from the said series in accordance with the dictation of said pattern mechanism.

11. Mechanism for operating upon independent heddles or the like comprising means to support in series heddles having differentially arranged perforations, a heddle releasing key engaging said perforations, and pattern mechanism controlling the operation of said key.

12. Mechanism for operating upon independent heddles or the like comprising means to support a series of independent heddles having differently arranged perforations therein, a key mounted in said perforations, means to operate said key to release the leading heddle, and means to move said key to traverse the series of heddles.

13. Mechanism for operating upon independent heddles or the like comprising means to support such heddles in series, heddle releasing means, means to separate released heddles, and pattern mechanism controlling the operation of said heddle releasing and heddle separating means.

14. Mechanism for operating upon independent heddles or the like comprising means to support independent heddles in series, heddle threading means, heddle releasing mechanism, heddle separating mechanism to separate released heddles, heddle positioning mechanism to position released heddles for the threading operation, and pattern mechanism controlling the operation of one or more of said mechanisms.

15. Mechanism for operating upon independent heddles or the like comprising heddle threading means, means to support a series of heddles, pattern mechanism and mechanism under the control of the pattern mechanism to position a heddle of said series for the threading operation.

16. Mechanism for operating upon metallic heddles or the like comprising means to support in a compacted series heddles having heddle releasing openings, a heddle releasing key mounted for rotation in said openings, a worm to receive released heddles, means to rotate said worm, and a positioning worm to receive the leading separated heddle and position the same for operation thereon.

17. Mechanism for operating upon independent heddles or the like comprising heddle threading mechanism, means to support independent heddles in a series, means to release the leading heddle from said series and move the same on the supporting means, rotary means to position the released heddle for the heddle threading action, and means to eject the threaded heddle.

18. Mechanism for operating upon independent heddles or the like comprising heddle threading means, means to support independent heddles in a series, means to release intermittently the leading heddle, rotary means to position the released heddle for the threading operation, and rotary ejecting means to eject the threaded heddle.

19. Mechanism for operating upon independent heddles or the like comprising heddle threading means, means to support independent heddles in a series, and a positioning worm to position the heddles in succession for the threading operation.

20. Mechanism for operating upon warp threads or the like comprising heddle threading means, means to support independent heddles in a series, and a rotary worm for positioning the heddles in succession for the threading operation, said worm having means for ejecting the threaded heddles.

21. Mechanism for operating upon independent heddles or the like comprising heddle threading means, means to support a series of independent heddles, a heddle separating worm, and a heddle positioning and ejecting worm to position the heddles successively for the threading operation and thereafter to eject the same.

22. Mechanism for operating upon independent heddles or the like comprising means to suspend a series of independent heddles, a follower engaging the rearmost heddle and having an inclined heddle receiving surface, and means to compact the series of heddles against the follower.

23. Mechanism for operating upon metallic heddles or the like comprising a heddle supporting bar upon which a series of heddles may be suspended, a carriage in frictional engagement with said supporting bar, a guideway for said carriage, means to compact the suspended series of heddles against said carriage, and means to release the leading heddle.

24. Mechanism for operating upon metallic heddles or the like comprising a bar whereon a series of heddles may be suspended, said bar being supported for removal upon the mechanism, a carriage formed to receive said heddle supporting bar, means to compact a suspended series of heddles with relation to said carriage, a guide way for said carriage, and means to confine said carriage to said guide way.

25. Mechanism for operating upon metallic heddles or the like comprising a heddle supporting bar whereon a series of heddles may be suspended, said bar being mounted for removal upon the mechanism, a heddle carriage frictionally receiving said bar and permitting the removal of said bar therefrom without removal of the heddles from the bar, a guide way for said carriage, means to confine the carriage thereto, means to compact the series of suspended heddles with relation to said carriage, and means to release the leading heddle from said series.

26. Mechanism for operating upon metallic heddles or the like comprising a heddle supporting bar mounted for removal upon the mechanism, a heddle carriage receiving said bar, and longitudinally movable with respect thereto, a guide way for said carriage, means to compact the series of suspended heddles with relation to said carriage, and means to advance the suspended heddles and the carriage with relation to said heddle supporting bar.

27. Mechanism for operating upon metallic heddles or the like comprising a heddle supporting bar upon which a series of heddles may be suspended, said bar being mounted for removal upon said mechanism, a carriage mounted for longitudinal movement with relation to said bar, and means supported in said carriage to compact the series of heddles with relation to said carriage.

28. Mechanism for operating upon metallic heddles or the like comprising a heddle supporting bar upon which a series of heddles may be suspended, said bar being mounted for removal upon said mechanism, a carriage mounted for longitudinal movement with relation to said bar, and heddle compacting means and individual heddle releasing means mounted in said carriage.

29. Mechanism for operating upon metallic heddles or the like comprising a heddle supporting bar, upon which a series of heddles may be suspended, supports for said bar adjustable longitudinally of said heddles, a heddle carriage mounted to engage said bar, a guide way for said carriage, means to compact the series of suspended heddles with relation to said carriage, and means to adjust said carriage longitudinally of the heddles.

30. Mechanism for operating upon warp threads comprising means to support a warp, a warp worm mounted for rotation in operative relation to said warp, pattern mechanism controlling the periods of rotation of said warp worm, and means to impart continuous rotation to said warp worm during said periods.

31. Mechanism for operating upon warp threads or the like comprising means to support a warp, one or more harnesses and a reed supported in parallelism with the warp, a reed opener, heddle selecting mechanism, thread separating mechanism, main driving mechanism, operative connections from said driving mechanism to impart intermittent movement to said reed opener and said harness selecting mechanism, and means to impart continuous movement to said thread separating mechanism.

32. Mechanism for operating upon warp threads or the like comprising warp supporting means, a plurality of harnesses and a reed mounted in parallelism therewith, thread drawing-in mechanism, devices to operate upon the reed, the heddles and the warp to position them for the drawing-in operation, pattern mechanism controlling the operation of said devices, means to impart an intermittent movement to the reed and to the harness operating devices while positioned for operation by said pattern mechanism, and means for imparting a continuous movement to the thread operating mechanism while controlled for operation by said pattern mechanism.

33. Mechanism for operating upon metallic heddles or the like comprising means to compact a series of heddles, heddle releasing mechanism, heddle separating mechanism to operate upon released heddles, differential driving connections between said heddle releasing and heddle separating mechanisms, and pattern mechanism controlling the operation of said mechanism.

34. Mechanism for operating upon warp threads comprising means to support a warp, harness supporting means for a plurality of harnesses, heddle selecting devices, a rotary warp thread separating mechanism, and means adapted to permit regular constant rotation of said thread separating mechanism during the regular, intermittent actuation of heddle selecting devices for two or more harnesses.

35. Mechanism for operating upon warp threads comprising means to support a warp, harness supporting means, reed supporting means, reed controlling mechanism, heddle selecting mechanism, a rotary warp thread selecting worm, main driving means, connections therefrom intermittently to operate the reed controlling and heddle selecting mechanism, and separate connections from said main driving means to rotate said warp thread selecting worm.

36. Mechanism for operating upon metallic heddles or the like comprising means to support such heddles in series independent of each other, means to release heddles successively from said series, means to convey or separate released heddles, and means for operating the heddle releasing means, whereby the latter forces the released heddle into position to be engaged by the said conveying or releasing means.

37. The combination with a series of detached, flat metallic heddles, or the like, of mechanism for operating upon the same comprising means to support a series of heddles, means to convey or separate heddles successively released from said series, and means positively to position a heddle with relation to said conveying or separating means.

38. Mechanism for operating upon metallic heddles or the like comprising means to support a warp, one or more harnesses and a reed in parallelism with the warp, heddle selecting mechanism, main driving mechanism, means adapted to be intermittently operated for the purpose of operating upon successive harness eyes, a rotary thread selector, and means connecting the same with the main driving mechanism and adapted to permit the constant rotation of the said selector during the intermittent actuation of the reed opener and heddle selecting mechanism.

39. Mechanism for operating upon warp threads or the like comprising means to support a warp and one or more harnesses in parallelism therewith, heddle selecting mechanism, means adapted to be intermittently operated to actuate said mechanism, a rotary thread selector, main driving mechanism, a clutch between the same and said rotary thread selector, and means controlling said clutch and adapted to permit the constant rotation of the said thread selector during the intermittent actuation of the heddle selecting mechanism.

40. Mechanism for operating upon independent heddles or the like comprising means to support a series of detached heddles, means to place threads through the eyes of said heddles, a carriage with relation to which said heddles may be supported, and means to adjust said carriage with reference to the thread placing mechanism.

41. Mechanism for operating upon metallic heddles or the like comprising a heddle supporting bar upon which a series of heddles may be suspended, supports for said bar adjustable longitudinally of said heddles, a heddle carriage mounted to engage said bar, a guide way for said carriage, means to compact the series of suspended heddles with relation to said carriage, means to place threads through the eyes of said heddles, and means to adjust the carriage with respect to said thread placing mechanism.

42. A machine for presenting warp threads to a thread taking device, comprising a warp support, a rotary warp-thread selecting device mounted for rotation in operative relation thereto, pattern mechanism controlling the periods of rotation of said selecting device, and means to impart continuous rotation thereto during such periods.

43. A machine of the character described having means for supporting a series of detached heddles, each movable independently of the other, means for threading the heddles, pattern mechanism, and means to release heddles from the series and move the same along the support prior to the threading operation in accordance with the dictation of said pattern mechanism.

44. A machine of the character described having means for holding a series of heddles, means for releasing successive members of the series, means for conveying a heddle from the position in which it is released to a heddle turning means, said conveying means and turning means forming a unitary member.

45. A machine of the character described having heddle conveying, turning, positioning and ejecting means, comprising a worm having a thread of relatively deep cut for conveying the heddle, a thread for turning the heddle gradually lessening in depth, starting from the outer side thereof to a flat portion parallel with its axis which positions the heddle to receive the warp, and a gradually receding deeper thread for ejecting the heddle in its normal position from said means.

46. Mechanism for operating upon flat metallic heddles comprising means to support such heddles in a plurality of series, heddle-engaging mechanism for each series including releasing means, conveying means, turning means and discharging means adapted positively to engage and control the position of a heddle from the time of its reposition to the time of its discharge, driving mechanism, and interposed pattern mechanism controlling the operation of the engaging mechanism in predetermined order whereby the operation of the engaging mechanism for any series of heddles may be interrupted pending the operation of the engaging mechanism of one or more other series.

47. Mechanism for operating upon flat, metallic heddles comprising means to support such heddles in a plurality of banks, heddle-engaging mechanism for each bank including separating, positioning and facing devices, driving mechanism connected to actuate the engaging mechanism, and interposed pattern mechanism adapted to interrupt the action of the engaging mechanism according to a predetermined pattern.

48. Mechanism for operating upon flat, metallic heddles, comprising means to support such heddles in a plurality of banks, heddle engaging mechanism for each bank including separating, positioning and facing devices, driving mechanism connected to actuate the engaging mechanism, and interposed, adjustable pattern mechanism adapted to interrupt the action of the engaging mechanism according to any selected, predetermined pattern.

49. Mechanism for operating upon flat, metallic heddles, heddle holding means to hold the heddles in a series, means to compact said series of heddles with a portion of each heddle bent from the normal plane thereof, releasing means acting against the bent portion of the foremost heddle to hold back the series, and means for actuating the releasing means to release said foremost heddle and permit the resiliency thereof to assist in separating it from the remainder of the series.

50. Mechanism for operating upon thin, flat, metallic heddles comprising heddle-holding means, releasing means engaging the foremost heddle and normally holding the same in said series, means to move said releasing means to release the foremost heddle, and compacting means acting in linear opposition to said releasing means to compact the heddles thereagainst whereby the resiliency of the heddle assists in separating it from the series when the releasing means is moved.

51. In a mechanism for acting upon metallic heddles, the combination with means for holding said heddles in a series, a shouldered releasing key engaging the foremost heddle but adapted to be withdrawn therefrom to permit its release from the series, and means for bowing the series of heddles against said key.

52. Mechanism for operating upon independent heddles comprising means to hold in series independent heddles having differentially arranged perforations, a heddle releasing key engaging said perforations, means to operate said key to release said heddles singly and successively from the series, and a packing device for said heddles, movable with relation to said releasing key.

53. In a machine for acting upon metallic heddles, the combination with means for holding a series of such heddles to present an alternate varying formation and provide each a holding portion uncovered by the preceding heddle, of holding means engaging the uncovered portion of the heddle to hold back all but the preceding heddle, means to disengage the holding means from the uncovered portion of the heddle and apply it to the uncovered portion of the next succeeding heddle, and a packing means movable with relation to said holding means to press the heddles against the same.

54. The combination with a plurality of detached, metallic heddles composed of thin, resilient sheet material of generally similar external, linear contour, each heddle having its flat face formed to present at some portion thereof a holding portion, and each heddle having a releasing opening, means for holding said heddles in series arrangement whereby a continuous aperture is formed in the heddles through the successive releasing openings, the holding portions being presented in regular alternation and variation of position in successive heddles, the holding part of one heddle being uncovered by the releasing opening of the preceding heddle, a releasing shaft passing through the formed aperture, releasing means carried by the end of the shaft and engaging the holding portion of the heddle to hold back all except the preceding heddle, means for turning said shaft to cause the releasing means to engage the holding portion of the next succeeding heddle, and a movable packing device through which the said shaft passes adapted to press against the end of the series and force the same against said releasing means.

55. In a machine for operating upon metallic heddles, the combination of means for supporting a series of such heddles, the heddle releasing device 169, the movable packer device 111 for said heddles, guiding means 114 for the said device, and the adjustable support 121 for the guiding means.

56. In a warp drawing machine, the combination with threading mechanism, a support therefor, means for supporting a series of independent metallic heddles having differentially arranged perforations, a heddle releasing key engaging said perforations, said key being mounted upon said threading mechanism support, means also on said threading mechanism support to operate said key to release said heddles singly and successively from the series, and means for causing a relative movement between said heddle support and said threading mechanism support.

57. In a warp drawing machine, the combination with threading mechanism, a support therefor, a support for metallic heddles having means for holding the heddles in series to present them in regular, alternate, linear variation as between successive members of the series, means upon said threading mechanism support and coöperating with the linear variation of the heddles to release the latter singly and successively from the series, and means for causing relative movement between said heddle support and said threading mechanism support.

58. In a warp drawing machine, the combination of a drawing-in needle, a needle carriage, a holder for a series of metallic heddles on which the heddles are held in a series presenting an alternate, varying formation and providing each a holding portion uncovered by the preceding heddle, holding means mounted on said needle carriage and engaging the uncovered portion of the heddle to hold back all but the preceding heddle, means also on said carriage to disengage the holding means from the uncovered portion of the heddle and apply it to the uncovered portion of the next succeeding heddle, and means for causing traversing movement of said needle carriage with relation to said heddle holder, said carriage movement also causing movement of the series of heddles on their holder.

59. In a machine for operating upon metallic heddles, the combination of means for holding a series of such heddles to present them in regular, alternate, linear variation as between successive members of the series, means coöperating with the linear variation to release the heddles singly and successively from the series, and positioning means positively to engage the heddle at the time of its release and position the same for a subsequent operation.

60. In a machine for operating upon metallic heddles, the combination of means for holding a series of such heddles in regular, alternate, linear variation as between successive members of the series, means coöperating with the linear variation to release the heddles singly and successively from the series, a positioning device comprising a rotary worm positioned positively to engage the heddle at the time of its release, and a turning device adapted to turn and face the heddle for a subsequent operation, said turning device also positively engaging the heddle when positioned by said worm.

61. In a machine for operating upon metallic heddles, the combination with means for holding a series of such heddles to present each a holding formation, the holding formation being presented in a varying position for successive heddles of the series, releasing means coöperating with the holding formations of said heddles to release them one by one, rotary positioning means and rotary turning means to face a positioned heddle, said heddles being positively engaged by said turning means when positioned by said rotary positioning means.

62. In a mechanism for operating upon metallic heddles, the combination with means for holding a series of such heddles, a rotary releasing means, a rotary positioning means, and a rotary facing means, the said releasing, positioning and facing means being in overlapping engagement with relation to said heddles whereby a released heddle is under the positive control of said mechanisms until the same has been faced.

63. In a machine for operating upon metallic heddles, the combination with means for holding a series of such heddles, means to separate the leading heddle from the series, means to position the same, and a rotary turning worm to turn a positioned heddle, a selected heddle being under the positive control of said positioning means and turning worm until the same has been faced.

64. In a machine for operating upon metallic heddles, the combination with means for supporting a series of such heddles having differentially arranged perforations, a heddle releasing key engaging said perforations, means to operate said key to release said heddles singly and successively from the series, a rotary conveying worm positioned to engage a heddle when released, and a rotary turning member to turn and face a heddle delivered by said conveying worm.

65. In a warp drawing machine, the combination with threading mechanism, a support therefor, means for holding flat, metallic heddles in compact series, rotary releasing means for releasing successive heddles, said releasing means being mounted upon said support, rotary conveying means also on said support for conveying a released heddle to a position to be faced, rotary heddle facing means also on said support, and means for causing relative movement between said support and said heddle-holding means.

66. In a machine for operating upon metallic heddles, the combination with means for holding a series of such heddles, a rotary heddle releasing member, a driving shaft therefor, a rotary heddle conveying member and driving shaft therefor, driving mechanism, a main driving head and an intermediate head to which latter said releasing and conveying driving shafts extend, and a common drive shaft for said last named shafts extending from said intermediate head to said main driving head.

67. Mechanism for operating upon independent heddles comprising means to support a plurality of series of independent heddles having differentially arranged perforations, a heddle releasing key for each series engaging said perforations, means to operate said key to release said heddles singly and successively from the series, and pattern mechanism to control the order of release.

68. In a machine for acting upon independent heddles or the like, the combination with heddle-releasing means of means for holding a series of such heddles to present to said releasing means each a holding formation, the holding formation being presented in a varying position for successive heddles of the series, said releasing means having such a formation as to engage and positively discharge said heddles from the series.

69. In a machine for acting upon independent heddles or the like, the combination of means for holding a series of such heddles to present each a holding formation, the holding formation being presented in a varying position for successive heddles of the series, heddle releasing means cooperating with said holding formations to release and positively force away from the series the successive heddles thereof.

70. Mechanism for operating upon independent heddles comprising means to support a series of independent heddles having individually arranged perforations, a heddle releasing key engaging said perforation, said key being given a helical formation, and means to operate said key to release said heddles singly and successively from the series and positively force the released heddle away therefrom.

71. In mechanism for operating upon metallic heddles, the combination of means for holding a series of such heddles, heddle selecting means for selecting the same singly and successively from the series, and heddle conveying means for conveying a selected heddle to a given position comprising a worm or screw acting at the side of the heddle and having a relatively deep thread to engage the heddle for substantially its entire width.

72. In a machine for acting upon independent heddles or the like, the combination with heddle releasing means of means for holding a series of such heddles to present to said releasing means each a holding formation, the holding formation being presented in a varying position for successive heddles of the series, and a heddle conveying worm or screw acting upon the sides of the heddles for conveying a released heddle to a given position.

73. In a machine for acting upon metallic heddles, the combination of means for holding a series of such heddles, rotary heddle releasing means, a rotary screw or worm to convey a released heddle and having a helical thread or groove engaging the sides of the heddles and a rotary facing device having a motion of rotation always in the same direction to face a heddle conveyed by the screw.

74. In a machine for acting upon metallic heddles, the combination of means for holding a series of such heddles, heddle releasing means, a rotary screw or worm to convey a released heddle and having a helical thread or groove engaging the sides of the heddles and a rotary facing device having a motion of rotation always in the same direction to face a heddle conveyed by the screw.

75. In a machine for acting upon metallic heddles, the combination with means for supporting a series of such heddles, heddle releasing means, a rotary conveying device in the form of a screw for conveying a released heddle, and a rotary heddle facing device formed by the continuation of the groove of said screw.

76. In a machine for threading metallic heddles, the combination with a threading mechanism of means for holding a series of such heddles, heddle selecting means for selecting the heddles one by one from said series, a rotary conveying device acting upon the sides of a selected heddle, and a coöperating rotary facing device having a motion of rotation always in the same direction and also acting upon the sides of the heddle to twist a conveyed heddle and face the same with reference to the threading mechanism.

77. In a machine for acting upon metallic heddles, the combination with means for holding a series of such heddles, heddle selecting means to select the heddles one by one, and a rotary heddle facer having the turning wall 175 and the holding wall 177.

78. In a machine for acting upon metallic heddles, the combination with means for holding a series of such heddles, heddle selecting means to select the heddles one by one, a rotary heddle facer having the turning wall 175 and the holding wall 177, and a coöperating abutment 176.

79. In a machine for acting upon metallic heddles, the combination of means for holding a series of such heddles, heddle selecting means to select the heddles one by one, a rotary heddle facer having the turning wall 175 and the holding wall 177, and the ejecting wall 178.

80. In a machine for acting upon metallic heddles, the combination of means for holding a series of such heddles, heddle releasing means comprising a heddle member and a releasing rod for actuating the same, a drive shaft, and a separating connection between said releasing rod and drive shaft whereby the releasing rod may be withdrawn from the machine.

81. Mechanism for operating upon independent heddles comprising means to hold a series of such heddles, means to select the heddles singly and successively from said series, turning means to twist and face a selected heddle, said turning means comprising a rotary member to engage and wipe the sides of the heddle, and an abutment between which and said rotary member the heddle is held pressed.

82. In a machine for acting upon metallic heddles, the combination of means to hold a series of such heddles, selecting means to select the heddles singly and successively from said series, a rotary screw conveyer to convey the selected heddles, and a rotary heddle turning device formed by a continuation of the thread of the screw and having a surface adapted to wipe the side of the heddle and face the same for a given operation.

83. In a machine for acting upon metallic heddles, the combination of means to hold a series of such heddles, selecting means to select the heddles singly and successively from said series, a rotary screw conveyer to convey the selected heddles, a rotary heddle turning device formed by a continuation of the thread of the screw and having a surface adapted to wipe the side of the heddle and face the same for a given operation, and an abutment against which said heddle is held faced.

In testimony whereof, we have signed our names to this specification, in the presence of two subscribing witnesses.

EDGAR F. HATHAWAY.
CHARLES D. LANNING.

Witnesses:
REUBEN L. ROBERTS,
FLORENCE A. COLLINS.